3,169,132
3-AMINOETHER PREGNANES
Robert D. Birkenmeyer, Daniel Lednicer, and Fred Kagan, Kalamazoo, and Barney J. Magerlein, Portage Township, Kalamazoo County, Mich., assignors to The Upjohn Company, Kalamazoo, Mich., a corporation of Delaware
No Drawing. Filed Apr. 7, 1961, Ser. No. 101,379
14 Claims. (Cl. 260—397.3)

This invention relates to new steroid compounds and is particularly concerned with 3-aminoethers of the pregnane series having the formulae:

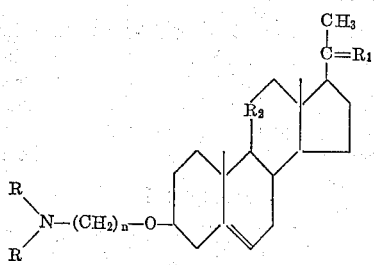

and

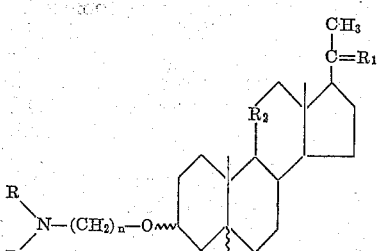

wherein $n$ has a value of 2 to 3, inclusive, wherein

is selected from the group consisting of

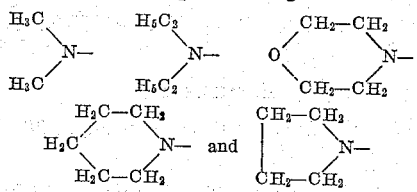

wherein $R_1$=selected from the group consisting of ketonic oxygen and =N—OH and wherein $R_2$ is selected from the group consisting of

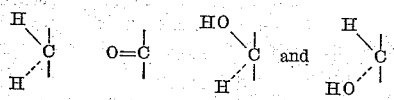

Furthermore, the invention relates to the N-oxides of the above defined products and the acid mineral salts of the above defined products, particularly the hydrochlorides and sulfates.

Additionally, the invention is concerned with the process of production for the above compounds.

The process of production of the compound of the structure shown above essentially comprises: conversion of a selected 20-ketal of 3-hydroxy-20-ketopregnane or 3-hydroxy-20-keto-5-pregnene to the 3-aminoether thereof with a selected amino-alkyl chloride by generally known procedures. During extraction with an acid the ketal group is hydrolyzed and the keto group regenerated. The 20-isonitroso compound is obtained by reacting the 3-aminoethers of 3-hydroxy-20-ketopregnanes with hydroxylamine mineral acid salt in the presence of a base such as potassium or sodium hydroxides or acetates, pyridine, piperidine, alkylpyridines and the like.

The aminoether, obtained in the form of a salt, can be converted to the free aminoether by treatment with a base, and can be, if desired, converted to the salts of other acids by treating the free aminoether base with such acids.

The compounds produced by these reactions have hypocholesteremic activity. The compounds are thus useful in the treatment of atherosclerosis which is a form of arteriosclerosis which is characterized by the fatty degeneration occurring in the arterial walls, by mechanisms not yet definitely established. Hypercholesteremia refers essentially to an excess of cholesterol in the blood serum. While the causes of hypercholesteremia and the nature of its role in atherosclerosis and relation conditions is not clearly understood, considerable effort has been directed toward reducing blood and tissue cholesterol levels as an attack upon the clinical conditions in which high levels are implicated. It has long been recognized that certain substances such as sitosterol, corn oil, and nicotinic acid are capable of reducing in small degree the blood and tissue cholesterol contents, either by interfering with the absorption of exogenous cholesterol introduced with food, or by facilitating the excretion of cholesterol from the body. Major emphasis, however, has been placed on the search for compounds which will interefere with the production of endogenous cholesterol by the liver and hence offer a more positive means of control of cholesterol levels.

The novel compounds of the present application significantly reduce the cholesterol content of both blood and tissue by partially arresting the biosynthesis of cholesterol in the body.

The new compounds, especially in their hydrochloric acid salt form, are also active against parasite-produced diseases in animals. They are particularly active against species of Trypanosoma, such as *Trypanosoma equiperdum* and Trichomonas such as *Trichomonas vaginalis*, *Entamoeba histolytica*, *Entamoeba coli* and against many of the eggs and larvae of common animal parasites. The novel materials, therefore, can be used against *Trichomonas vaginalis*, incorporated into suppositories or bougies, or can be used in sprays and as powders, in animal bedding, for cattle or poultry in order to prevent parasitic diseases.

The new compounds also act on the central nervous system, reducing motor-activity and are thus useful as tranquilizers for caged animals or animals in transport.

In carrying out the process of the present invention, the selected starting materials, 20-ketals of 3-hydroxy-20-ketopregnanes or 5-pregnenes, are dissoloved in an organic solvent, and reacted with the selected di-N-substituted aminoalkyl chloride. The reaction is carried out in the presence of an alkali metal metathetically active reagent, such as triphenylmethyl lithium, sodium or potassium; metal hydrides such as sodium or potassium hydride or an alkyl alkali metal compound such as propyl or butyl lithium or propyl or butyl sodium.

The amount of the di-N-substituted aminoalkyl chloride used in this reaction is preferably in excess of one mole (plus 5 to 50%) per mole of steroid. The base alkali metal metathetically acting reagent is used in a ratio of 1.1 moles of base per mole of steroid. These quantities, however, are not critical and larger amounts can be used.

The ketal derivative which is used in the preferred embodiment of this reaction is usually produced by reacting the 20-keto steroid with glycols, wherein the total number of carbon atoms is up to 8, inclusive, and wherein the hydroxyl groups are on carbon atoms separated at the most by one methylene group.

The reaction mixture for the etherification is usually kept at reflux temperature, that is depending on the solvent between 60 and 120° C., and the period of reflux is usually about 2 to 24 hours. After the reaction is terminated, the product is recovered by conventional methods, that is by extraction, recrystallization or chromatography with organic solvents. Since the tertiary amino compound is easily converted to its hydrochloride, in which form it is water-soluble, it is usually extracted from the reaction mixture with aqueous hydrochloric acid. Ether can be added to the reaction mixture for better results in the extraction. Since the free amino base is found to be usually a viscous oil rather than crystalline material, the product is generally used in the form of its hydrochloric acid or sulfuric acid salts.

If 20-oximes are desired the selected 3-aminoether of a 20-keto pregnane or pregnene is treated with either hydroxylamine or its mineral acid salt such as hydroxylamine hydrochloride or hydroxylamine sulfate in a suitable solvent such as an alkanol, for example, methanol, ethanol, propanol, isopropanol, butanol or a tertiary amine for example pyridine, collidine, N,N-dimethylaniline and the like or preferably an alcohol in the presence of a base reagent such as tertiary amine, sodium or potassium hydroxides, carbonates or acetates to give the corresponding 20-isonitroso steroid. This process is broadly referred to as oximation. An excess of hydroxylamine salt, usually from 1.1 to 5 molar equivalents per mole of steroid is preferably employed. The preferred hydroxylamine mineral acid salt is hydroxylamine hydrochloride. Alternatively, hydroxylamine itself can be used in place of the hydroxylamine salt and base.

The reaction is preferably carried out at 20 to 120 degrees centigrade and conveniently at the reflux temperature of the reaction mixture. Under this condition the reaction time is usually from 10 minutes to 48 hours. Both higher and lower temperatures and shorter and longer reaction times are operative. The lower temperature usually requires a correspondingly longer reaction.

The reaction product thus obtained can be isolated from the reaction mixture by conventional methods for example, separating undissolved inorganic material from the solution through filtration of the reaction mixture when in an organic solvent, and thereupon evaporating the filtrate, to obtain the nitroso steroid. Alternatively, the reaction mixture may be poured into water and the resultant precipitate (the nitroso steroid) separated by filtration. Additional purification of the product can be acomplished by conventional methods, for example, by recrystallization from suitable solvents or a mixture of solvents such as methanol, dilute aqueous methanol, ethanol, isopropanol, ether, methylene chloride, methylene chloride-Skellysolve B (hexanes) and the like.

The 3-aminoether pregnanes or pregnenes, obtained in these reactions can be subjected to additional reactions known in the art, such as:

(1) Reduction of the 11-keto group by lithium aluminum hydride to give the 11β-hydroxy group.

(2) Reduction of the 11-keto group by sodium metal in propanol to give the 11α-hydroxy group.

(3) Converting the 3-aminoether pregnanes or pregnenes when in the salt form (usually hydrochlorides) to the free base by treating these salts with a base, e.g., sodium or potassium carbonate, bicarbonate or dilute solution of sodium or potassium hydroxide to obtain the free base.

(4) Conversion of 3-aminoether pregnanes or pregnenes to the amine salts by treating the free base with a mineral acid such as hydrochloric, sulfuric, hydrobromic, hydroiodic acid or organic acids such as acetic, trimethylacetic, propionic, butyric, valeric, benzoic or lauric acid and the like.

PREPARATION 1

*3α-hydroxy-5α-pregnane-20-one 20-ethylene ketal*

A mixture of 5 grams of 3α-hydroxy-5α-pregnane-20-one, ten milliliters of ethylene glycol, 0.5 gram of p-toluene-sulfonic acid, and 300 milliliters of benzene was refluxed for 4 hours. The water formed in this reaction was removed by codistillation with benzene. The benzene solution was washed with water, dried over anhydrous sodium sulfate and evaporated to give a residue. This residue was twice recrystallized from ethyl acetate-hexanes to give 3α-hydroxy-5α-pregnane-20-one 20-ethylene ketal.

In the same manner given in preparation 1, by reacting the corresponding 20-ketopregnanes and 20-ketopregnenes with ethylene glycol or other alkylene-1,2-; 2,3-; 1,3-; or 2,4-diols in the presence of an acid catalyst results in the corresponding ketal of the 20-ketopregnane or 20-keto-5-pregnene. Representative 20-ketals thus obtained include:

3α-hydroxy-5β-pregnane-20-one 20-ethylene ketal
3β-hydroxy-5α-pregnane-20-one 20-ethylene ketal
3β-hydroxy-5β-pregnane-20-one 20-ethylene ketal
3α-hydroxy-5β-pregnane-11,20-dione 20-ethylene ketal
3β-hydroxy-5α-pregnane-11,20-dione 20-ethylene ketal
11-ketopregnenolone 20-ethylene ketal and the like

EXAMPLE 1

*3β-(2-diethylaminoethoxy)-5-pregnen-20-one hydrochloride*

To a solution of 10 grams of pregnenolone 20-ketal, in 300 milliliters of ether, there was added 1.6 grams of 52.4% dispersion of sodium hydride in oil. The mixture was heated under reflux for five hours. At the end of this time there was added 10 milliliters of a 1:1 by weight mixture of β-diethylaminoethyl chloride and toluene. The suspension was refluxed for a period of 18 hours. After cooling, the suspension was washed with water, then with 750 milliliters of 0.5 normal hydrochloric acid. The acid washes were allowed to stand for 24 hours at room temperature and then extracted with methylene chloride. The residue, obtained by evaporation of the methylene chloride extracts to dryness, was recrystallized four times from ethyl acetate to yield 1.67 grams of 3β-(2-diethylaminoethoxy)-5-pregnen-20-one hydrochloride. The infrared spectrum of 3β-(2-diethylaminoethoxy)-5-pregnen-20-one hydrochloride showed that some solvation (hydrate) occurred.

*Analysis.*—Calcd. for $C_{27}H_{46}ClNO_2 \cdot \frac{1}{2}H_2O$: C, 70.33; H, 1027; N, 3.04. Found: C, 70.65; H, 10.26; N, 3.42.

EXAMPLE 2

*3α-(2-diethylaminoethoxy)-5β-pregnane-11,20-dione hydrochloride*

A mixture of 5.3 grams (0.015 mole) of 3α-hydroxy-5β-pregnane-11,20-dione 20-ketal and 0.173 gram (0.016 mole) of sodium hydride dispersion in oil (52.4%) and 75 milliliters of benzene was stirred under reflux for 20 hours. After cooling, 4.1 grams of a 1:1 by weight mixture of diethylaminoethyl chloride and toluene was added. After an additional 24 hours of heating ether was added and the organic layer containing 3α-(2-diethylaminoethoxy)-5β-pregnane-11,20-dione 20-ethylene ketal washed to neutrality. The base was extracted with 250 milliliters of 0.5 normal hydrochloric acid and this solution washed with methylene chloride. The amorphous solid which remained when the solvent, methylene chloride, was removed was allowed to stand for 18 hours with 50 milliliters of 2 normal aqueous hydrochloric acid. This solution was then diluted with 50 milliliters of water and extracted with methylene chloride. The methylene chloride solution was evaporated and the thus-obtained residue recrystallized twice from ethyl acetate: methylene chloride to give 2.84 grams of 3α-(2-diethylaminoethoxy)-5β-pregnan-11,20-dione hydrochloride of melting point 192 to 194°.

EXAMPLE 3

*3β-(3-diethylaminopropoxy)-5-pregnene-20-one hydrochloride*

In the same manner given in Example 1, pregnenolone 20-ketal was heated with potassium hydride and thereupon treated with diethylaminopropyl chloride to give 3β-(3-diethylaminopropoxy) - 5 - pregnene-20-one hydrochloride.

EXAMPLE 4

*3β-(3-dimethylaminopropoxy)-5-pregnen-20-one hydrochloride*

In the same manner given in Example 1, pregnenolone 20-ketal was heated with potassium hydride and thereupon treated with dimethylaminopropyl chloride to give 3β-(3-dimethylaminopropoxy) - 5-pregnen-20-one hydrochloride.

EXAMPLE 5

*3β-(2-dimethylaminoethoxy)-5-pregnen-20-one hydrochloride*

In the same manner given in Example 1, pregnenolone 20-ketal was heated with potassium hydride and thereupon treated with dimethylaminoethyl chloride to give 3β-(2-dimethylaminoethoxy) - 5 - pregnen-20-one hydrochloride.

EXAMPLE 6

*3β-(2-morpholinylethoxy)-5-pregnen-20-one hydrochloride*

In the same manner given in Example 1, pregnenolone 20-ketal was heated with potassium hydride and thereupon treated with morpholinylethyl chloride to give 3β-(2-morpholinylethoxy)-5-pregnen-20-one hydrochloride.

EXAMPLE 7

*3β-(2-piperidinylethoxy)-5-pregnen-20-one hydrochloride*

In the same manner given in Example 1, pregnenolone 20-ketal was heated with potassium hydride and thereupon treated with piperidinylethyl chloride to give 3β-(2-piperidinylethoxy)-5-pregnen-20-one hydrochloride.

EXAMPLE 8

*3β-(2-pyrrolidinylethoxy)-5-pregnen-20-one hydrochloride*

In the same manner given in Example 1, pregnenolone 20-ketal was heated with potassium hydride and thereupon treated with pyrrolidinylethyl chloride to give 3β-(2-pyrrolidinylethoxy)-5-pregnen-20-one hydrochloride.

EXAMPLE 9

*3β-(2-diethylaminoethoxy)-5-pregnene-11,20-dione hydrochloride*

In the same manner given in Example 1, 11-ketopregnenolone 20-ketal is heated with potassium hydride and thereupon treated with diethylaminoethyl chloride to give 3β-(2-diethylaminoethoxy)-5-pregnene-11,20-dione hydrochloride.

EXAMPLE 10

*3β-(2-dimethylaminoethoxy)-5-pregnene-11,20-dione hydrochloride*

In the same manner given in Example 1, 11-ketopregnenolone 20-ketal is heated with potassium hydride and thereupon treated with dimethylaminoethyl chloride to give 3β-(2-dimethylaminoethoxy)-5-pregnene-11,20-dione hydrochloride.

EXAMPLE 11

*3β-(3-dimethylaminopropoxy)5-pregnene-11,20-dione hydrochloride*

In the same manner given in Example 1, 11-ketopregnenolone 20-ketal is heated with potassium hydride and thereupon treated with dimethylaminopropyl chloride to give 3β-(3-dimethylaminopropoxy) - 5 - pregnene - 11,20-dione hydrochloride.

EXAMPLE 12

*3β-(3-diethylaminopropoxy)-5-pregnene-11,20-dione hydrochloride*

In the same manner given in Example 1, 11-ketopregnenolone 20-ketal is heated with potassium hydride and thereupon treated with diethylaminopropyl chloride to give 3β-(3-diethylaminopropoxy)-5-pregnene-11,20-dione hydrochloride.

EXAMPLE 13

*3β-(2-morpholinylethoxy)-5-pregnene-11,20-dione hydrochloride*

In the same manner given in Example 1, 11-ketopregnenolone 20-ketal is heated with potassium hydride and thereupon treated with morpholinylethyl chloride to give 3β-(2-morpholinylethoxy)-5-pregnene-11,20-dione hydrochloride.

EXAMPLE 14

*3β-(2-piperidinylethoxy)-5-pregnene-11,20-dione hydrochloride*

In the same manner given in Example 1, 11-ketopregnenolone 20-ketal is heated with potassium hydride and thereupon treated with piperidinylethyl chloride to give 3β - (2-piperidinylethoxy)-5-pregnene-11,20-dione hydrochloride.

EXAMPLE 15

*3β-(2-pyrrolidinylethoxy)-5-pregnene-11,20-dione hydrochloride*

In the same manner given in Example 1, 11-ketopregnenolone 20-ketal is heated with potassium hydride and thereupon treated with pyrrolidinylethyl chloride to give 3β - (2 - pyrrolidinylethoxy) - 5 - pregnene - 11,20 - dione hydrochloride.

EXAMPLE 16

*3α-(2-diethylaminoethoxy)-5β-pregnan-20-one hydrochloride*

In the same manner given in Example 2, 3α-hydroxy-5β-pregnan-20-one 20-ketal is heated with sodium hydride and thereupon treated with diethylaminoethyl chloride to give 3α - (2-diethylaminoethoxy)-5β-pregnan-20-one hydrochloride.

EXAMPLE 17

*3α-(2-dimethylaminoethoxy)-5β-pregnan-20-one hydrochloride*

In the same manner given in Example 2, 3α-hydroxy-5β-pregnan-20-one 20-ketal is heated with sodium hydride and thereupon treated with dimethylaminoethyl chloride to give 3α - (2-dimethylaminoethoxy)-5β-pregnan-20-one hydrochloride.

EXAMPLE 18

*3α-(2-morpholinylethoxy)-5β-pregnan-20-one hydrochloride*

In the same manner given in Example 2, 3α-hydroxy-5β-pregnan-20-one 20-ketal is heated with sodium hydride and thereupon treated with morpholinylethyl chloride to give 3α - (2 - morpholinylethoxy)-5β-pregnan-20-one hydrochloride.

EXAMPLE 19

*3α-(2-pyrrolidinylethoxy)-5β-pregnan-20-one hydrochloride*

In the same manner given in Example 2, 3α-hydroxy-5b-pregnan-20-one 20-ketal is heated with sodium hydride and thereupon treated with pyrrolidinylethyl chloride to give 3α-(2-pyrrolidinylethoxy)-5β-pregnan-20-one hydrochloride.

Example 20

*3α-(2-piperidinylethoxy)-5β-pregnan-20-one hydrochloride*

In the same manner given in Example 2, 3α-hydroxy-5β-pregnan-20-one 20-ketal is heated with sodium hydride and thereupon treated with piperidinylethyl chloride to give 3α-(2-piperidinylethoxy)-5β-pregnan-20-one hydrochloride.

Example 21

*3β-(2-diethylaminoethoxy)-5α-pregnan-20-one hydrochloride*

In the same manner given in Example 2, 3β-hydroxy-5α-pregnan-20-one 20-ketal is heated with sodium hydride and thereupon treated with diethylaminoethyl chloride to give 3β-(2-diethylaminoethoxy)-5α-pregnan-20-one hydrochloride.

Example 22

*3β-(2-morpholinylethoxy)-5α-pregnan-20-one hydrochloride*

In the same manner given in Example 2, 3β-hydroxy-5α-pregnan-20-one 20-ketal is heated with sodium hydride and thereupon treated with morpholinylethyl chloride to give 3β - (2 - morpholinylethoxy)-5α-pregnan-20-one hydrochloride.

Example 23

*3α-(2-diethylaminoethoxy)-5α-pregnan-20-one hydrochloride*

In the same manner given in Example 2, 3α-hydroxy-5α-pregnan-20-one 20-ketal is heated with sodium hydride and thereupon treated with diethylaminoethyl chloride to give 3a - (2 - diethylaminoethoxy)-5α-pregnan-20-one hydrochloride.

Example 24

*3α-(2-morpholinylethoxy)-5α-pregnan-20-one hydrochloride*

In the same manner given in Example 2, 3α-hydroxy-5α-pregnan-20-one 20-ketal is heated with sodium hydride and thereupon treated with morpholinylethyl chloride to give 3α - (2 - morpholinylethoxy)-5α-pregnan-20-one hydrochloride.

Example 25

*3β-(2-diethylaminoethoxy)-5β-pregnan-20-one hydrochloride*

In the same manner given in Example 2, 3β-hydroxy-5β-pregnan-20-one 20-ketal is heated with sodium hydride and thereupon treated with diethylaminoethyl chloride to give 3β-(2-diethylaminoethoxy)5β-pregnan-20-one hydrochloride.

Example 26

*3β-(2-morpholinylethoxy)-5β-pregnan-20-one hydrochloride*

In the same manner given in Example 2, 3β-hydroxy-5β-pregnan-20-one 20-ketal is heated with sodium hydride and thereupon treated with morpholinylethyl chloride to give 3β - (2 - morpholinylethoxy)-5β-pregnan-20-one hydrochloride.

Example 27

*3-α-(2-diethylaminoethoxy)-5β-pregnane-11,20-dione hydrochloride*

In the same manner given in Example 2, 3α-hydroxy-5β-pregnane-11,20-dione 20-ketal is heated with sodium hydride and thereupon treated with diethylaminoethyl chloride to give 3α-(2-diethylaminoethoxy)-5β-pregnane-11,20-dione hydrochloride.

Example 28

*3α-(2-dimethylaminoethoxy)-5β-pregnane-11,20-dione hydrochloride*

In the same manner given in Example 2, 3α-hydroxy-5β-pregnane-11,20-dione 20-ketal is heated with sodium hydride and thereupon treated with dimethylaminoethyl chloride to give 3α - (2-dimethylaminoethoxy)-5β-pregnane-11,20-dione hydrochloride.

Example 29

*3α-(2-morpholinylethoxy)-5β-pregnane-11,20-dione hydrochloride*

In the same manner given in Example 2, 3α-hydroxy-5β-pregnane-11,20-dione 20-ketal is heated with sodium hydride and thereupon treated with morpholinylethyl chloride to give 3α-(2-morpholinylethoxy)-5β-pregnane-11,20-dione hydrochloride.

Example 30

*3α-(2-piperidinylethoxy)-5β-pregnane-11,20-dione hydrochloride*

In the same manner given in Example 2, 3α-hydroxy-5β-pregnane-11,20-dione 20-ketal is heated with sodium hydride and thereupon treated with piperidinylethyl chloride to give 3α-(2-piperidinylethoxy)-5β-pregnane-11,20-dione hydrochloride.

Example 31

*3α-(2-pyrrolidinylethoxy)-5β-pregnane-11,20-dione hydrochloride*

In the same manner given in Example 2, 3α-hydroxy-5β-pregnane-11,20-dione 20-ketal is heated with sodium hydride and thereupon treated with pyrrolidinylethyl chloride to give 3α-(2-pyrrolidinylethoxy)-5β-pregnane-11,20-dione hydrochloride.

Example 32

*3β-(2-diethylaminoethoxy)-5α-pregnane-11,20-dione hydrochloride*

In the same manner given in Example 2, 3β-hydroxy-5α-pregnane-11,20-dione 20-ketal is heated with sodium hydride and thereupon treated with diethylaminoethyl chloride to give 3β-(2-diethylaminoethoxy)-15α-pregnane-11,20-dione hydrochloride.

Example 33

*3β-(2-morpholinylethoxy)-5α-pregnane-11,20-dione hydrochloride*

In the same manner given in Example 2, 3β-hydroxy-5α-pregnane-11,20-dione 20-ketal is heated with sodium hydride and thereupon treated with morpholinylethyl chloride to give 3β-(2-morpholinylethoxy)-5α-pregnane-11,20-dione hydrochloride.

Example 34

*3β-(2-piperidinylethoxy)-5α-pregnane-11,20-dione hydrochloride*

In the same manner given in Example 2, 3β-hydroxy-5α-pregnane-11,20-dione 20-ketal is heated with sodium hydride and thereupon treated with piperidinylethyl chloride to give 3β-(2-piperidinylethoxy)-5α-pregnane-11,20-dione hydrochloride.

Example 35

*3β-(2-diethylaminoethoxy)-5β-pregnane-11,20-dione hydrochloride*

In the same manner given in Example 2, 3β-hydroxy-5β-pregnane-11,20-dione 20-ketal is heated with sodium hydride and thereupon treated with diethylaminoethyl chloride to give 3β-(2-diethylaminoethoxy)-5β-pregnane-11,20-dione hydrochloride.

Example 36

*3β-(2-morpholinylethoxy)-5β-pregnane-11,20-dione hydrochloride*

In the same manner given in Example 2, 3β-hydroxy-5β-pregnane-11,20-dione 20-ketal is heated with sodium hydride and thereupon treated with morpholinylethyl chloride to give 3β-(2-morpholinylethoxy)-5β-pregnane-11,20-dione hydrochloride.

EXAMPLE 37

In the same manner given in Example 1, other hydrochlorides of 3-aminoethers of 20-ketals of 3-hydroxypregnanes and 3-hydroxypregnenes can be made by reacting the 20-ketal of a selected 3-hydroxypregnane or 3-hydroxypregnene with a selected dialkylaminoalkylchloride, morpholinylalkylchloride, piperidinylalkylchloride or pyrrolidinylalkylchloride. 3-aminoethers thus obtained comprise:

3β-(3-dimethylaminopropoxy)-5-pregnen-20-one hydrochloride;
3β-(3-morpholinylpropoxy)-5-pregnen-20-one hydrochloride;
3β-(3-piperidinylpropoxy)-5-pregnen-20-one hydrochloride;
3β-(3-pyrrolidinylpropoxy)-5-pregnen-20-one hydrochloride;
3β-(3-morpholinylpropoxy)-5-pregnene-11,20-dione hydrochloride;
3β-(3-piperidinylpropoxy)-5-pregnene-11,20-dione hydrochloride;
3β-(3-pyrrolidinylpropoxy)-5-pregnene-11,20-dione hydrochloride;
3α-(3-diethylaminopropoxy)-5β-pregnan-20-one hydrochloride
3α-(3-morpholinylpropoxy)-5β-pregnan-20-one hydrochloride;
3α-(3-pyrrolidinylpropoxy)-5β-pregnan-20-one hydrochloride
3α-(3-piperidinylpropoxy)-5β-pregnan-20-one hydrochloride;
3β-(2-dimethylaminoethoxy)-5α-pregnan-20-one hydrochloride;
3β-(3-diethylaminopropoxy)-5α-pregnan-20-one hydrochloride;
3β-(2-pyrrolidinylethoxy)-5α-pregnan-20-one hydrochloride;
3β-(3-pyrrolidinylpropoxy)-5α-pregnan-20-one hydrochloride;
3β-(2-piperidinylethoxy)-5α-pregnan-20-one hydrochloride;
3β-(3-piperidinylpropoxy)-5α-pregnan-20-one hydrochloride;
3α-(2-dimethylaminoethoxy)-5α-pregnan-20-one hydrochloride;
3α-(3-diethylaminopropoxy)-5α-pregnan-20-one hydrochloride;
3α-(2-pyrrolidinylethoxy)-5α-pregnan-20-one hydrochloride;
3α-(3-pyrrolidinylpropoxy)-5α-pregnan-20-one hydrochloride;
3α-(2-piperidinylethoxy)-5α-pregnan-20-one hydrochloride;
3α-(3-piperidinylpropoxy)-5α-pregnan-20-one hydrochloride;
3β-(-2-dimethylaminoethoxy)-5β-pregnan-20-one hydrochloride;
3β-(3-diethylaminopropoxy)-5β-pregnan-20-one hydrochloride;
3β-(2-pyrrolidinylethoxy)-5β-pregnan-20-one hydrochloride;
3β-(3-pyrrolidinylpropoxy)-5β-pregnan-20-one hydrochloride;
3β-(2-piperidinylethoxy)-5β-pregnan-20-one hydrochloride;
3β-(3-piperidinylpropoxy)-5β-pregnan-20-one hydrochloride;
3α-(3-diethylaminopropoxy)-5β-pregnane-11,20-dione hydrochloride;
3α-(3-dimethylaminopropoxy)-5β-pregnane-11,20-dione hydrochloride;
3α-(2-diethylaminoethoxy)-5α-pregnane-11,20-dione hydrochloride;
3α-(3-morpholinylpropoxy)-5β-pregnane-11,20-dione hydrochloride;
3α-(3-piperidinylpropoxy)-5β-pregnane-11,20-dione hydrochloride;
3α-(3-pyrrolidinylpropoxy)-5β-pregnane-11,20-dione hydrochloride;
3β-(3-diethylaminopropoxy)-5α-pregnane-11,20-dione hydrochloride;
3β-(3-dimethylaminopropoxy)-5α-pregnane-11,20-dione hydrochloride;
3β-(3-morpholinylpropoxy)-5α-pregnane-11,20-dione hydrochloride;
3β-(3-piperidinylpropoxy)-5α-pregnane-11,20-dione hydrochloride;
3β-(3-pyrrolidinylpropoxy)-5α-pregnane-11,20-dione hydrochloride;
3β-(3-diethylaminopropoxy)-5β-pregnane-11,20-dione hydrochloride;
3β-(3-dimethylaminopropoxy)-5β-pregnane-11,20-dione hydrochloride;
3β-(3-morpholinylpropoxy)-5β-pregnane-11,20-dione hydrochloride;
3β-(3-piperidinylpropoxy)-5β-pregnane-11,20-dione hydrochloride;
3β-(3-pyrrolidinylpropoxy)-5β-pregnane-11,20-dione hydrochloride.

EXAMPLE 38

*3α-(2-diethylaminoethoxy)-20-isonitroso-5β-pregnan-11-one*

A suspension of 3.46 grams of 3α-(2-diethylaminoethoxy)-5β-pregnane-11,20-dione hydrochloride in water was made basic with solid sodium bicarbonate. The free amine was taken up in ether, the solution dried and the solvent removed in vacuo. The residual oil was dissolved in a mixture of 1.60 grams of pyridine and 30 milliliters of ethanol. Following the addition of 1.40 grams of hydroxylamine hydrochloride, the mixture was heated on the steam bath for 20 minutes and then allowed to cool. The thus-obtained suspension was then diluted with water and made basic with sodium bicarbonate. The precipitate that formed was taken up in ether and this solution washed to neutrality with water. The solid which remained when the solvent was removed (3.20 grams) was recrystallized several times from aqueous methanol to give 3α-(2-diethylaminoethoxy)-20-isonitroso-5β-pregnan-11-one of melting point 161–164°.

*Analysis.*—Calcd. for $C_{27}H_{46}N_2O_3$: C, 72.60, H, 10.38; N, 6.27. Found: C, 72.58; H, 10.58; N, 6.56.

EXAMPLE 39

*3β-(2-diethylaminoethoxy)-20-isonitroso-5-pregnene*

In the manner given in Example 38, two grams of 3β-(2-diethylaminoethoxy)-20-isonitroso-5-pregnene hydrochloride was made basic with solid potassium bicarbonate. The mixture was extracted with ether and the ether solution of the free amine dried over anhydrous sodium sulfate and thereupon distilled in vacuo. The residual material was dissolved in 60 milliliters of ethanol and thereto was added five grams of hydroxylamine hydrochloride and 3.5 grams of sodium hydroxide in the presence of 5 milliliters of water. The mixture was heated to reflux for a period of 75 minutes. Thereafter the mixture was allowed to cool to room temperature, poured into 250 milliliters of water and extracted with methylene chloride. The methylene chloride extracts were combined, dried over anhydrous sodium sulfate and evaporated to give a residue which was four times recrystallized from aqueous methanol to give 3β-(2-diethylaminoethoxy)-20-isonitroso-5-pregnene.

In the same manner given in Examples 38 and 39, other 3-aminoethers of 5α- and 5β-pregnane and 5-pregnene as produced in Examples 1 to 37 in the form of hydrochlorides are converted to the corresponding 20-isonitroso compounds by (1) converting the hydrochloric acid salts of the 3-aminoethers to the free base with potassium or sodium bicarbonate or by dropwise addition of sodium hydroxide or potassium hydroxide dissolved in aqueous alcoholic solvent mixtures, until the mixture is basic, and reacting the thus obtained free 3-aminoether bases with hydroxylamine hydrochloride or hydroxylamine sulfate in the presence of a base to give the corresponding 3-aminoethers of 20-isonitroso pregnanes or pregnenes. Representative compounds thus obtained include:

3β-(2-dimethylaminoethoxy)-20-isonitroso-5-pregnene;
3β-(2-morpholinylethoxy)-20-isonitroso-5-pregnene;
3β-(2-piperidinylethoxy)-20-isonitroso-5-pregnene;
3β-(2-pyrrolidinylethoxy)-20-isonitroso-5-pregnene;
3β-(3-dimethylaminopropoxy)-20-isonitroso-5-pregnene;
3β-(3-diethylaminopropoxy)-20-isonitroso-5-pregnene;
3β-(3-morpholinylpropoxy)-20-isonitroso-5-pregnene;
3β-(3-piperidinylpropoxy)-20-isonitroso-5-pregnene;
3β-(3-pyrrolidinylpropoxy)-20-isonitroso-5-pregnene;
3β-(2-dimethylaminoethoxy)-20-isonitroso-5-pregnen-11-one;
3β-(2-morpholinylethoxy)-20-isonitroso-5-pregnen-11-one;
3β-(2-piperidinylethoxy)-20-isonitroso-5-pregnen-11-one;
3β-(2-pyrrolidinylethoxy)-20-isonitroso-5-pregnen-11-one;
3β-(3-dimethylaminopropoxy)-20-isonitroso-5-pregnen-11-one;
3β-(3-diethylaminopropoxy)-20-isonitroso-5-pregnen-11-one;
3β-(3-morpholinylpropoxy)-20-isonitroso-5-pregnen-11-one;
3β-(3-piperidinylpropoxy)-20-isonitroso-5-pregnen-11-one;
3β-(3-pyrrolidinylpropoxy)-20-isonitroso-5-pregnen-11-one;
3α-(2-morphinylaminoethoxy)-20-isonitroso-5β-pregnane;
3α-(3-dimethylaminopropoxy)-20-isonitroso-5β-pregnane;
3α-(2-diethylaminoethoxy)-20-isonitroso-5β-pregnane;
3β-(2-morphinylaminoethoxy)-20-isonitroso-5α-pregnane;
3β-(3-dimethylaminopropoxy)-20-isonitroso-5α-pregnane;
3β-(2-diethylaminoethoxy)-20-isonitroso-5α-pregnane;
3α-(2-morphinylaminoethoxy)-20-isonitroso-5α-pregnane;
3α-(3-dimethylaminopropoxy)-20-isonitroso-5α-pregnane;
3α-(2-diethylaminoethoxy)-20-isonitroso-5α-pregnane;
3β-(2-morphinylaminoethoxy)-20-isonitroso-5β-pregnane;
3β-(3-dimethylaminopropoxy)-20-isonitroso-5β-pregnane;
3β-(2-diethylaminoethoxy)-20-isonitroso-5β-pregnane;
3α-(2-dimethylaminoethoxy)-20-isonitroso-5β-pregnan-11-one;
3α-(3-diethylaminopropoxy)-20-isonitroso-5β-pregnan-11-one;
3α-(2-morpholinylethoxy)-20-isonitroso-5β-pregnan-11-one;
3α-(2-pyrrolidinylethoxy)-20-isonitroso-5β-pregnan-11-one;
3α-(3-piperidinylpropoxy)-20-isonitroso-5β-pregnan-11-one;
3β-(2-dimethylaminoethoxy)-20-isonitroso-5α-pregnan-11-one;
3β-(3-diethylaminopropoxy)-20-isonitroso-5α-pregnan-11-one;
3β-(2-morpholinylethoxy)-20-isonitroso-5α-pregnan-11-one;
3β-(2-pyrrolidinylethoxy)-20-isonitroso-5α-pregnan-11-one;
3β-(3-piperidinylpropoxy)-20-isonitroso-5α-pregnan-11-one.

EXAMPLE 40

*3α-(2-diethylaminoethoxy)-11β-hydroxy-5β-pregnan-20-one*

3α-(2-diethylaminoethoxy) - 5β - pregnane-11,20-dione 20-ethylene ketal was prepared as shown in Example 2 by treating 3α-hydroxy-5β-pregnene-11,20-dione 20-ketal with sodium hydride in benzene solution and thereupon with diethylaminoethyl chloride. After refluxing this mixture, the organic layer was washed with water until neutral, dried over anhydrous sodium sulfate and evaporated to give crude 3α-(2-diethylaminoethoxy)-5β-pregnane-11,20-dione 20-ethylene ketal.

Fifty (50) milliliters of tetrahydrofuran containing 5 grams of 3α-(2-diethylaminoethoxy)-5β-pregnane-11,20-dione 20-ethylene ketal was added to a well-stirred suspension of two grams of lithium aluminum hydride in 20 milliliters of tetrahydrofuran. The mixture was heated under reflux with stirring for six hours and was thereupon allowed to cool. Excess reagent was destroyed with ethyl acetate. A hundred milliliters of water and a hundred milliliters of ether were then added. The mixture was shaken and the organic layer separated and washed several times with water. The organic layer was thereupon dried over anhydrous sodium sulfate and then evaporated yielding a solid residue. This residue was taken up in ether and the ether solution extracted with 0.5 N hydrochloric acid. The suspension of the hydrochloride in the aqueous acid was extracted with chloroform and the chloroform extracts combined and evaporated to give a residue. This residue was recrystallized twice from chloroform-ethyl acetate to give 3α-(2-diethylaminoethoxy)-11β-hydroxy - 5β-pregnan-20-one hydrochloride.

EXAMPLE 41

*3β-(2-diethylaminoethoxy)-11β-hydroxy-5-pregnen-20-one hydrochloride*

In the same manner given in Example 40, 11-ketopregnenolone 20-ethylene ketal was prepared by reacting 11-ketopregnenolone 20-ketal with sodium hydride and thereupon with β-diethylaminoethyl chloride in benzene solution, heating the thus-obtained mixture for 18 to 24 hours, then cooling the mixture and washing with water and thereupon evaporating the reaction mixture to dryness.

The thus-obtained 3β - (2 - diethylaminoethoxy)-11β-hydroxy-5-pregnene-11,20-dione 20-ketal was reduced with lithium aluminum hydride in tetrahydrofuran and the thus-obtained 3β-(2-diethylaminoethoxy)-11β-hydroxy-5-pregnen-20-one recovered in the form of its hydrochloride.

In the same manner given in Example 40, other 3-aminoethers of 11β-hydroxy pregnanes and pregnenes can be made by reducing the corresponding 11,20-dione 20-ketals with lithium aluminum hydride and subsequently recovering the product as hydrochloride. Representative compounds thus obtained include:

3β-(3-diethylaminopropoxy)-11β-hydroxy-5-pregnen-20-one hydrochloride;
3β-(2-morpholinylethoxy)-11β-hydroxy-5-pregnen-20-one hydrochloride;
3β-(2-pyrrolidinylethoxy)-11β-hydroxy-5-pregnen-20-one hydrochloride;
3β-(2-piperidinylethoxy)-11β-hydroxy-5-pregnen-20-one hydrochloride;
3β-(3-morpholinylpropoxy)-11β-hydroxy-5-pregnen-20-one hydrochloride;
3β-(3-diethylaminopropoxy)-11β-hydroxy-5-pregnen-20-one hydrochloride;
3α-(2-dimethylaminoethoxy)-11β-hydroxy-5β-pregnan-20-one hydrochloride;

3α-(2-morpholinylethoxy)-11β-hydroxy-5β-pregnan-20-one hydrochloride;
3α-(3-pyrrolidinylpropoxy)-11β-hydroxy-5β-pregnan-20-one hydrochloride;
3α-(2-piperidinylethoxy)-11β-hydroxy-5β-pregnan-20-one hydrochloride;
3β-(2-dimethylaminoethoxy)11β-hydroxy-5α-pregnan-20-one hydrochloride;
3β-(2-morpholinylethoxy)-11β-hydroxy-5α-pregnan-20-one hydrochloride;
3β-(3-pyrrolidinylpropoxy)-11β-hydroxy-5α-pregnan-20-one hydrochloride;
3β-(2-piperidinylethoxy)-11β-hydroxy-5α-pregnan-20-one hydrochloride.

EXAMPLE 42

3α-(2-diethylaminoethoxy)-11α-hydroxy-5β pregnan-20-one hydrochloride

To a solution of 0.5 gram of 3α-(2-diethylaminoethoxy)-5β-pregnane-11,20-dione 20-ketal (example 40), in 50 milliliters of normal propyl alcohol at reflux temperature, is added five grams of sodium in small pieces. After a period of one hour, methanol is added to decompose the remaining unreacted sodium. To the reaction mixture is thereupon added 50 milliliters of water and the mixture is distilled until the product separates from it. The crude product is removed from the essentially aqueous medium by filtration and is recrystallized from a mixture of chloroform and ethyl acetate to give pure crystalline 3α-(2-diethylaminoethoxy)-11α-hydroxy-5β-pregnan-20-one 20-ketal.

The ketal was taken up in 0.5 aqueous ethanolic hydrochloric acid and the mixture was allowed to stand over night. It was then diluted with water and extracted with methylene chloride. The methylene chloride extracts were combined, dried and evaporated and the thus-obtained residue three times recrystallized from ethyl acetate to give 3α-(2-diethylaminoethoxy)-11α-hydroxy-5β-pregnen-20-one hydrochloride.

In the same manner as shown in Example 42, other 3-aminoethers of 11α-hydroxy pregnenes can be made by reducing the corresponding 11,20-dione pregene 20-ketals with sodium metal and normal propyl alcohol. Treatment of these compounds with hydrochloric acid yields the corresponding hydrochloride. Compounds thus obtained include:

3β-(3-diethylaminopropxy)-11α-hydroxy-5-pregnen-20 one hydrochloride;
3β-(2-morpholinylethoxy)-11α-hydroxy-5-pregnen-20-one hydrochloride;
3β-(2-pyrrolidinylethoxy)-11α-hydroxy-5-pregnen-20-one hydrochloride;
3β-(2-piperidinylethoxy)-11α-hydroxy-5-pregnen-20-one hydrochloride;
3β-(3-morpholinylpropoxy)-11α-hydroxy-5-pregnen-20-one hydrochloride;
3β-(3-dimethylaminopropoxy)-11α-hydroxy-5-pregnen-20-one hydrochloride;
3α-(2-dimethylaminoethoxy)-11α-hydroxy-5β-pregnan-20-one hydrochloride;
3α-(2-morpholinylethoxy)-11α-hydroxy-5β-pregnan-20-one hydrochloride;
3α-(3-pyrrolidinylpropoxy)-11α-hydroxy-5β-pregnan-20-one hydrochloride;
3α-(2-piperidinylethoxy)-11α-hydroxy-5β-pregnan-20-one hydrochloride;
3α-(2-diethylaminoethoxy)-11α-hydroxy-5α-pregnan-20-one hydrochloride;
3β-(2-dimethylaminoethoxy)-11α-hydroxy-5α-pregnan-20-one hydrochloride;
3β-(2-morpholinylethoxy)-11α-hydroxy-5α-pregnan-20-one hydrochloride;
3β-(3-pyrrolidinylpropoxy)-11α-hydroxy-5α-pregnan-20-one hydrochloride;
3β-(2-piperpidinylethoxy)-11α-hydroxy-5α-pregnan-20-one hydrochloride;
3β-(2-diethylaminoethoxy)-11β-hydroxy-5β-pregnan-20-one hydrochloride.

EXAMPLE 43

3α(2-diethylaminoethoxy)-11β-hydroxy-20-isonitroso-5β-pregnane

In the same manner given in Example 38, 3α-(2-diethylaminoethoxy)-11β-hydroxy-5β-pregnan-20-one hydrochloride was treated first with solid sodium bicarbonate to give the free amine and then with hydroxylamine hydrochloride and pyridine in ethanol solution. Heating the reaction mixture, then diluting with water and adding basic sodium bicarbonate gave a precipitate which was taken up with ether and several times recrystallized to give pure 3α-(2-diethylaminoethoxy)-11β-hydroxy-20-isonitroso-5β-pregnane.

In the same manner given in Example 43, other 3-aminoethers of 11β- and 11α-hydroxy-20-insonitroso-pregnanes can be made from the products shown in Examples 40 to 43, inclusive. Representative compounds include: 3β - (2-diethylaminoethoxy)-11β-hydroxy-20-isonitroso-5-pregnene; 3β - (2-diethylaminoethoxy)-11α-hydroxy-20-isonitroso-5-pregnene; 3α-(2-diethylaminoethoxy)-11α-hydroxy-20-isonitroso-5β-pregnane and the like.

Treatment of the 20-isonitroso compounds of the foregoing products with hydrochloric acid, sulfuric acid, hydrobromic acid, acetic acid, propionic acid and the like in alcohol or ether solution gives the corresponding acid salts of these aminoethers.

Treatment of any of the salts of 3-aminoethers of the beforegoing pregnanes and pregnenes with carbonate or bicarbonates of potassium or sodium, or titrating such salts with sodium hydroxide or potassium hydroxide solution until pinkness to phenolphthaleine gives the 3-aminoethers of the foregoing pregnanes and pregnenes as free bases.

EXAMPLE 44

3β-(2-diethylaminoethoxy)-5-pregnen-20-one N-oxide hydrochloride

To a solution of 3β-(2-diethylaminoethoxy)-5-pregnen-20-one hydrochloride (3.2 grams), dissolved in 20 milliliters of methanol, was added 10 milliliters of a 5 percent solution of sodium hydroxide in methanol. After swirling for five minutes the mixture was filtered and the filtrate evaporated to dryness under vacuum. The residue was taken up in 100 milliliters of methylene chloride which was then washed with three 25-milliliter portions of water. The methylene chloride phase was filtered and then evaporated to dryness under vacuum, yielding the free base of the starting hydrochloride. This white solid material was dissolved in 10 milliliters of ethanol, cooled in an ice bath and five milliliters of 30 percent hydrogen peroxide solution added. After standing at about 25 degrees for 18 hours, the excess hydrogen peroxide was destroyed by portionwise addition of 500 milligrams of platinum oxide catalyst. Filtration and evaporation of the obtained filtrate gave a white solid which was dissolved in ether. Hydrogen chloride gas was bubbled into this solution and the white solid which precipitated was collected, dried and recrystallized twice from acetone to give 3β-(2-diethylaminoethoxy)-5-pregnen-20-one N-oxide hydrochloride.

EXAMPLE 45

3α-(2-diethylaminoethoxy)-11β-hydroxy-5β-pregnan-20-one N-oxide hydrochloride

To a mixture of 0.38 mole of diethylaminoethyl chloride, dissolved in 250 milliliters of ethanol and cooled in an ice-bath, was added 125 milliliters of 30 percent hydrogen peroxide. After standing at about five degrees for 18 hours, the excess hydrogen peroxide was destroyed by the portionwise addition of platinum oxide catalyst. After filtration, the solvent was evaporated in vacuo to yield crude diethylaminoethyl chloride N-oxide.

This crude diethylaminoethyl chloride N-oxide was added to a benzene solution of the lithium salt of 3α,11β-dihydroxy-5β-pregnan-20-one 20-ethylene ketal obtained by treating this 20-ethylene ketal in benzene solution with triphenylmethyl lithium. The reaction mixture was heated at reflux for 24 hours, cooled to room temperature, diluted with 1000 milliliters of ether and extracted with three portions of 750 milliliters of hydrochloric acid (one part 37 percent hydrochloric acid and nine parts water). The combined aqueous acidic extracts were washed once with 750 milliliters of ether and then extracted with three 500-milliliter portions of methylene dichloride. The methylene dichloride extracts were combined, dried, evaporated and the thus-obtained residue twice recrystallized from ethanol to give 3α-(2-diethylaminoethoxy)-11β-hydroxy-5β-pregnan-20-one N-oxide hydrochloride.

In the same manner given in Example 44, other N-oxide hydrochlorides can be synthesized, such as:

3β-(2-dimethylaminoethoxy)-5-pregnen-20-one N-oxide hydrochloride;
3β-(3-diethylaminopropoxy)-5-pregnen-20-one N-oxide hydrochloride;
3β-(3-morpholinylpropoxy)-5-pregnen-20-one N-oxide hydrochloride;
3β-(3-pyrrolidinylpropoxy)-5-pregnen-20-one N-oxide hydrochloride;
3β-(2-piperidinylethoxy)-5-pregnene-20-one N-oxide hydrochloride;
3β-(2-dimethylaminoethoxy)-5-pregnene-11,20-dione N-oxide hydrochloride;
3β-(3-diethylaminopropoxy)-5-pregnene-11,20-dione N-oxide hydrochloride;
3β-(3-morpholinylpropoxy)-5-pregnene-11,20-dione N-oxide hydrochloride;
3β-(3-pyrrolidinylpropoxy)-5-pregnene-11,20-dione N-oxide hydrochloride;
3β-(2-piperidinylethoxy)-5-pregnene-11,20-dione N-oxide hydrochloride;
3α-(2-dimethylaminoethoxy)-5β-pregnan-20-one N-oxide hydrochloride;
3α-(3-diethylaminopropoxy)-5β-pregnan-20-one N-oxide hydrochloride;
3α-(2-morpholinylethoxy)-5β-pregnan-20-one N-oxide hydrochloride;
3α-(2-piperidinylethoxy)-5β-pregnan-20-one N-oxide hydrochloride;
3β-(2-dimethylaminoethoxy)-5α-pregnan-20-one N-oxide hydrochloride;
3β-(3-diethylaminopropoxy)-5α-pregnan-20-one N-oxide hydrochloride;
3β-(2-morpholinylethoxy)-5α-pregnan-20-one N-oxide hydrochloride;
3β-(2-piperidinylethoxy)-5α-pregnan-20-one N-oxide hydrochloride;
3β-(2-dimethylaminoethoxy)-5β-pregnan-20-one N-oxide hydrochloride;
3β-(3-diethylaminopropoxy)-5β-pregnan-20-one N-oxide hydrochloride;
3β-(2-morpholinylethoxy)-5β-pregnan-20-one N-oxide hydrochloride;
3β-(2-piperidinylethoxy)-5β-pregnan-20-one N-oxide hydrochloride;
3α-(2-dimethylaminoethoxy)-5α-pregnan-20-one N-oxide hydrochloride;
3α-(3-diethylaminopropoxy)-5α-pregnan-20-one N-oxide hydrochloride;
3α-(2-morpholinylethoxy)-5α-pregnan-20-one N-oxide hydrochloride;
3α-(2-piperidinylethoxy)-5α-pregnan-20-one N-oxide hydrochloride;
3α-(2-dimethylaminoethoxy)-5β-pregnane-11,20-dione N-oxide hydrochloride;
3α-(3-diethylaminopropoxy)-5β-pregnane-11,20-dione N-oxide hydrochloride;
3α-(2-morpholinylethoxy)-5β-pregnane-11,20-dione N-oxide hydrochloride;
3α-(2-piperidinylethoxy)-5β-pregnane-11,20-dione N-oxide hydrochloride;
3β-(2-dimethylaminoethoxy)-5α-pregnane-11,20-dione N-oxide hydrochloride;
3β-(3-diethylaminopropoxy)-5α-pregnane-11,20-dione N-oxide hydrochloride;
3β-(2-morpholinylethoxy)-5α-pregnane-11,20-dione N-oxide hydrochloride;
3β-(2-piperidinylethoxy)-5α-pregnane-11,20-dione N-oxide hydrochloride;
3β-(2-dimethylaminoethoxy)-5β-pregnane-11,20-dione N-oxide hydrochloride;
3β-(3-diethylaminopropoxy)-5β-pregnane-11,20-dione N-oxide hydrochloride;
3β-(2-morpholinylethoxy)-5β-pregnane-11,20-dione N-oxide hydrochloride;
3β-(2-piperidinylethoxy)-5β-pregnane-11,20-dione N-oxide hydrochloride;
3α-(2-dimethylaminoethoxy)-5α-pregnane-11,20-dione N-oxide hydrochloride;
3α-(3-diethylaminopropoxy)-5α-pregnane-11,20-dione N-oxide hydrochloride;
3α-(2-morpholinylethoxy)-5α-pregnane-11,20-dione N-oxide hydrochloride;
3α-(2-piperidinylethoxy)-5α-pregnane-11,20-dione N-oxide hydrochloride.

In the same manner given in Example 45, N-oxides of 11-oxygenated pregnane ethers can be synthesized, such as 3α-(2-diethylaminoethoxy)-11α-hydroxy-5β-pregnan-20-one N-oxide hydrochloride;
3α-(3-dimethylaminopropoxy)-11α-hydroxy-5β-pregnan-20-one N-oxide hydrochloride;
3α-(2-morpholinylethoxy)-11α-hydroxy-5β-pregnan-20-one N-oxide hydrochloride;
3α-(3-piperidinylpropoxy)-11α-hydroxy-5β-pregnan-20-one N-oxide hydrochloride;
3α-(2-diethylaminoethoxy)-11β-hydroxy-5β-pregnan-20-one N-oxide hydrochloride;
3α-(3-dimethylaminopropoxy)-11β-hydroxy-5β-pregnan-20-one N-oxide hydrochloride;
3α-(2-morpholinylethoxy)-11β-hydroxy-5β-pregnan-20-one N-oxide hydrochloride;
3α-(3-piperidinylpropoxy)-11β-hydroxy-5β-pregnan-20-one N-oxide hydrochloride;
3α-(2-dimethylaminoethoxy)-11β-hydroxy-5β-pregnan-20-one N-oxide hydrochloride;
3α-(3-diethylaminopropoxy)-11β-hydroxy-5β-pregnan-20-one N-oxide hydrochloride;
3α-(2-morpholinylethoxy)-11β-hydroxy-5β-pregnan-20-one N-oxide hydrochloride;
3α-(3-pyrrolidinylpropoxy)-11β-hydroxy-5β-pregnan-20-one N-oxide hydrochloride;
3β-(2-dimethylaminoethoxy)-11β-hydroxy-5α-pregnan-20-one N-oxide hydrochloride;
3β-(3-diethylaminopropoxy)-11β-hydroxy-5α-pregnan-20-one N-oxide hydrochloride;
3β-(2-morpholinylethoxy)-11β-hydroxy-5α-pregnan-20-one N-oxide hydrochloride;
3β-(3-pyrrolidinylpropoxy)-11β-hydroxy-5α-pregnan-20-one N-oxide hydrochloride;
3α-(2-dimethylaminoethoxy)-11α-hydroxy-5β-pregnan-20-one N-oxide hydrochloride;
3α(3-diethylaminopropoxy)-11α-hydroxy-5β-pregnan-20-one N-oxide hydrochloride;
3α-(2-morpholinylethoxy)-11α-hydroxy-5β-pregnan-20-one N-oxide hydrochloride;
3α-(3-pyrrolidinylpropoxy)-11α-hydroxy-5β-pregnan-20-one N-oxide hydrochloride;
3β-(2-dimethylaminoethoxy)-11α-hydroxy-5α-pregnan-20-one N-oxide hydrochloride;

3β-(3-diethylaminopropoxy)-11α-hydroxy-5α - pregnan-20-one N-oxide hydrochloride;

3β-(2-morpholinylethoxy)-11α-hydroxy-5 - pregnen - 20-one N-oxide hydrochloride;

3β-(3-pyrrolidinylpropoxy)-11α-hydroxy-5-pregnen - 20-one N-oxide hydrochloride and the like.

EXAMPLE 46

*3β(2-diethylaminoethylthio)-5-pregnen-20-one hydrochloride*

To a solution of 72 grams of 3β-hydroxy-5-pregnen-20-one 20-ethylene ketal in 120 milliliters of pyridine was added 77 grams of p-toluenesulfonyl chloride. After standing at about 25 degrees centigrade for 18 hours a white precipitate appeared which was collected and recrystallized from ether to give 3β-hydroxy-5-pregnen-20-one 20-ethylene ketal p-toluenesulfonate.

A solution of 51.5 grams of 3β-hydroxy-5-pregnen-20-one 20-ethylene ketal p-toluenesulfonate, 90 grams of thiourea, 500 milliliters of ethyl alcohol and 50 milliliters of pyridene were heated under reflux for 5 hours. The reaction mixture was diluted with water to turbidity and then allowed to cool slowly. The thus-obtained precipitate was collected, suspended in boiling acetone and filtered. The acetone-insoluble product was recrystallized from alcohol or alcohol-ether to give 3β-isothiouronium-5-pregnen-20-one 20-ethylene ketal p-toluenesulfonate.

A solution of 6.15 grams of 3β-isothiouronium-5-pregnen-20-one 20 ethylene ketal p-toluenesulfonate and 1.2 grams of sodium hydroxide in 100 milliliters of ethyl alcohol was heated under reflux for about 2 hours. Thirteen milliliters of water was added and heating at reflux continued for 2 hours more. The reaction mixture was poured into ice water, made acid with 0.5 N hydrochloric acid and stirred at about 25 degrees centigrade for 5 hours. The precipitate which separated during this acid wash was collected, dried and recrystallized from ethyl acetate or acetone-Skellysolve B to give 3β-mercapto-5-pregnen-20-one.

A mixture of 5-grams of 3β-mercapto-5-pregnen-20-one, 10 milliliters of ethylene glycol, 0.5 gram of p-toluenesulfonic acid and 300 milliliters of benzene was refluxed for 4 hours. The water formed in this reaction was removed by codistillation with benzene. The benzene solution was washed with water, dried over anhydrous sodium sulfate and evaporated to dryness. The thus-obtained residue was recrystallized from acetone to give 3β-mercapto-5-pregnen-20-one 20 ethylene ketal.

To a solution of 10 grams of 3β-mercapto-5-pregnen-20-one 20 ethylene ketal in one liter of benzene was added 1.75 grams of butyl lithium in hexane. The mixture was heated under reflux for fixe hours. At the end of this time there was added 3.5 grams of β,β-diethylaminoethyl chloride. The reaction mixture was refluxed for 18 hours, cooled to about 20 degrees centigrade and shaken with two 500-milliliter portions of 0.5 normal hydrochloric acid. The acid washes were combined and extracted with methylene chloride. The residue, obtained by evaporation of the methylene chloride extracts to dryness was recrystallized from ethyl acetate or acetone-Skellysolve B, to yield 3β-(2-diethylaminoethylthio)-5-pregnen-20-one hydrochloride.

EXAMPLE 47

*3β-(2-diethylaminoethylthio)-20-isonitroso-5-pregnene*

An aqueous solution of 4.71 grams of 3β-(2-diethylaminoethylthio)-Δ⁵-pregnen-20-one hydrochloride was made basic with solid sodium bicarbonate. The free amine was taken up in either, the solution dried and the solvent evaporated. The residual oil was dissolved in a mixture of 2.16 grams of pyridine and 41 milliliters of ethyl alcohol and 1.9 grams of hydroxylamine hydrochloride added. The mixture was heated on a steam bath for about 30 minutes and allowed to cool to about 25 degrees centigrade. The reaction mixture was diluted with water, made basic with sodium bicarbonate and extracted with ether. The ether extracts were washed with water, dried and the solvent evaporated. The solid residue was recrystallized from aqueous methanol to yield the desired product.

In the same manner given the Example 46, 3β-(2-diethylaminoethylthio)-5-pregnene-11,20-dione can be prepared which compound can be selectively reduced as shown earlier to give 3β-(2-diethylaminoethylthio)-11α-hydroxy-5-pregnen-20-one hydrochloride and 3β-(2-diethylamino ethylthio)-11β-hydroxy-5-pregnen-20-one hydrochloride.

In the same manner given in Example 1, reacting 20-ketals of 3β-mercapto-5-pregnen-20-one, 3β-mercapto-11β-hydroxy-5-pregnen-20-one, 3β-mercapto-11α-hydroxy-5-pregnen-20-one or 3β-mercapto-5-pregnene-11,20-dione with dialkylaminoalkyl halides, N-oxides of dialkylaminoalkyl halides, morpholino-, pyrrolidino-, piperidino-N-alkyl halides and N-oxides thereof gives the corresponding 3-thioethers of such compounds. Representative examples of such compounds include:

3β - (2-dimethylaminoethylthio)-5-pregnen-20-one hydrochloride;

3β - (2 - morpholinylethylthio) - 5-pregnen-20-one hydrochloride;

3β - (2-diethylaminoethylthio)-5-pregnen-20-one N-oxide hydrochloride;

3β - (3 - diethylaminopropylthio)-11α-hydroxy-5-pregnen-20-one hydrochloride;

3β - (2 - dimethylaminoethylthio)-11β-hydroxy-5-pregnen-20-one hydrochloride;

3β - (2 - piperidinoethylthio) - 11β-hydroxy-5-pregnen-20-one N-oxide hydrochloride;

3β - (2 - pyrrolidinopropylthio) - 5 - pregnene-11,20-dione hydrochloride;

3β - (3 - diethylaminopropylthio)-5-pregnene-11,20-dione N-oxide hydrochloride and the like.

We claim:

1. Steroid compounds selected from the group consisting of compounds of the formulae:

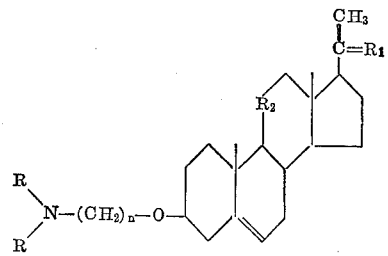

and

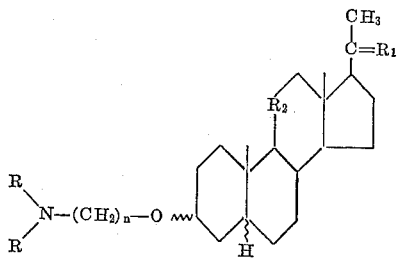

wherein *n* has a value of 2 to 3, inclusive, wherein

is selected from the group consisting of

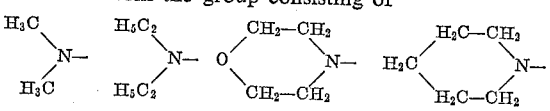

and

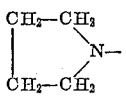

wherein $R_1$ is selected from group consisting of ketonic oxygen and $=N-OH$ and wherein $R_2$ is selected from the group consisting of

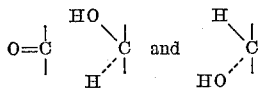

the N-oxides of these compounds, and the mineral acid salts of these compounds.

2. $3\beta$ - (2 - diethylaminopropoxy) - $11\alpha$ - hydroxy - 5-pregnen-20-one hydrochloride.

3. $3\beta$ - (2 - diethylaminoethoxy) - $11\beta$ - hydroxy - 5-pregnen-20-one hydrochloride.

4. $3\alpha$ - (2 - diethylaminoethoxy) - $5\beta$ - pregnane - 11, 20-dione hydrochloride.

5. $3\alpha$ - (2 - diethylaminoethoxy) - 20 - isonitroso - $5\beta$-pregnan-11-one.

6. $3\beta$ - (2 - diethylaminoethoxy) - 5 - pregnen - 20-one N-oxide hydrochloride.

7. $3\beta$ - (dimethylaminoethoxy) - 20 - isonitroso - 5-pregnen-11-one.

8. $3\alpha$ - (2 - dimethylaminoethoxy) - $5\beta$ - pregnan - 20-one N-oxide hydrochloride.

9. $3\alpha$ - (2 - diethylaminoethoxy) - 20 - isonitroso - $5\beta$-pregnan-11-one.

10. $3\alpha$ - (2 - diethylaminoethoxy) - $11\beta$ - hydroxy - 20-isonitroso-$5\beta$-pregnane.

11. $3\alpha$ - (2 - diethylaminoethoxy) - $11\beta$ - hydroxy - $5\beta$-pregnan-20-one N-oxide hydrochloride.

12. $3\beta$ - (2 - dimethylaminoethoxy) - 5 - pregnene - 11, 20-dione N-oxide hydrochloride.

13. $3\beta$ - (2 - diethylaminoethylthio) - $11\beta$ - hydroxy - 5-pregnen-20-one hydrochloride.

14. $3\beta$ - (3 - diethylaminopropylthio) - 5 - pregnene-11,20-dione N-oxide hydrochloride.

No references cited.

LEWIS GOTTS, *Primary Examiner.*

UNITED STATES PATENT OFFICE
CERTIFICATE OF CORRECTION

Patent No. 3,169,132                                                  February 9, 1965

Robert D. Birkenmeyer et al.

It is hereby certified that error appears in the above numbered patent requiring correction and that the said Letters Patent should read as corrected below.

Column 2, line 17, for "relation" read -- related --; column 4, line 46, for "ClNO$_2$·1/2" read -- ClNO$_2$ 1/2 --; line 47, for "1027" read -- 10.27 --; column 5, line 71, for "-(3-dimethylaminopropoxy)5-", in italics, read -- -(3-dimethylaminopropoxy)-5- --, in italics; column 6, line 72, for "5b-" read -- 5β- --; column 7, line 51, for "-(2-diethylaminoethoxy)5β-" read -- -(2-diethylaminoethoxy)-5β- --; line 63, for "3-α-", in italics, read -- 3α- --, in italics; column 8, line 40, for "-15α-" read -- -5α- --; column 9, line 29, after "hydrochloride" insert a semicolon; line 33, after "chloride" insert a semicolon; same column 9, line 60, for "3β-(-2-" read -- 3β-(2- --; column 12, line 72, for "-(3-diethylaminopropoxy)-" read -- -(3-dimethylaminopropoxy)- --; column 13, line 43, for "pregene" read -- pregnene --; line 48, for "-(3-diethylaminopropxy)-" read -- -(3-diethylaminopropoxy)- --; column 14, line 7, for "3α(2-", in italics, read -- 3α-(2- --, in italics; column 16, line 68, for "3α(3-" read -- 3α-(3- --; column 17, line 29, for "20 ethylene" read -- 20-ethylene --; line 40, for "5-grams" read -- 5 grams --; lines 48 and 50, for "20 ethylene", each occurrence, read -- 20-ethylene --; same column 17, line 52, for "fixe" read -- five --; column 19, line 15, for "3β-(2-" read -- 3β-(3- --; column 20, line 3, for "3β-(dimethylaminoethoxy)-" read -- 3β-(2-dimethylaminoethoxy)- --.

Signed and sealed this 7th day of December 1965.

(SEAL)
Attest:

ERNEST W. SWIDER                                EDWARD J. BRENNER
Attesting Officer                              Commissioner of Patents